UNITED STATES PATENT OFFICE.

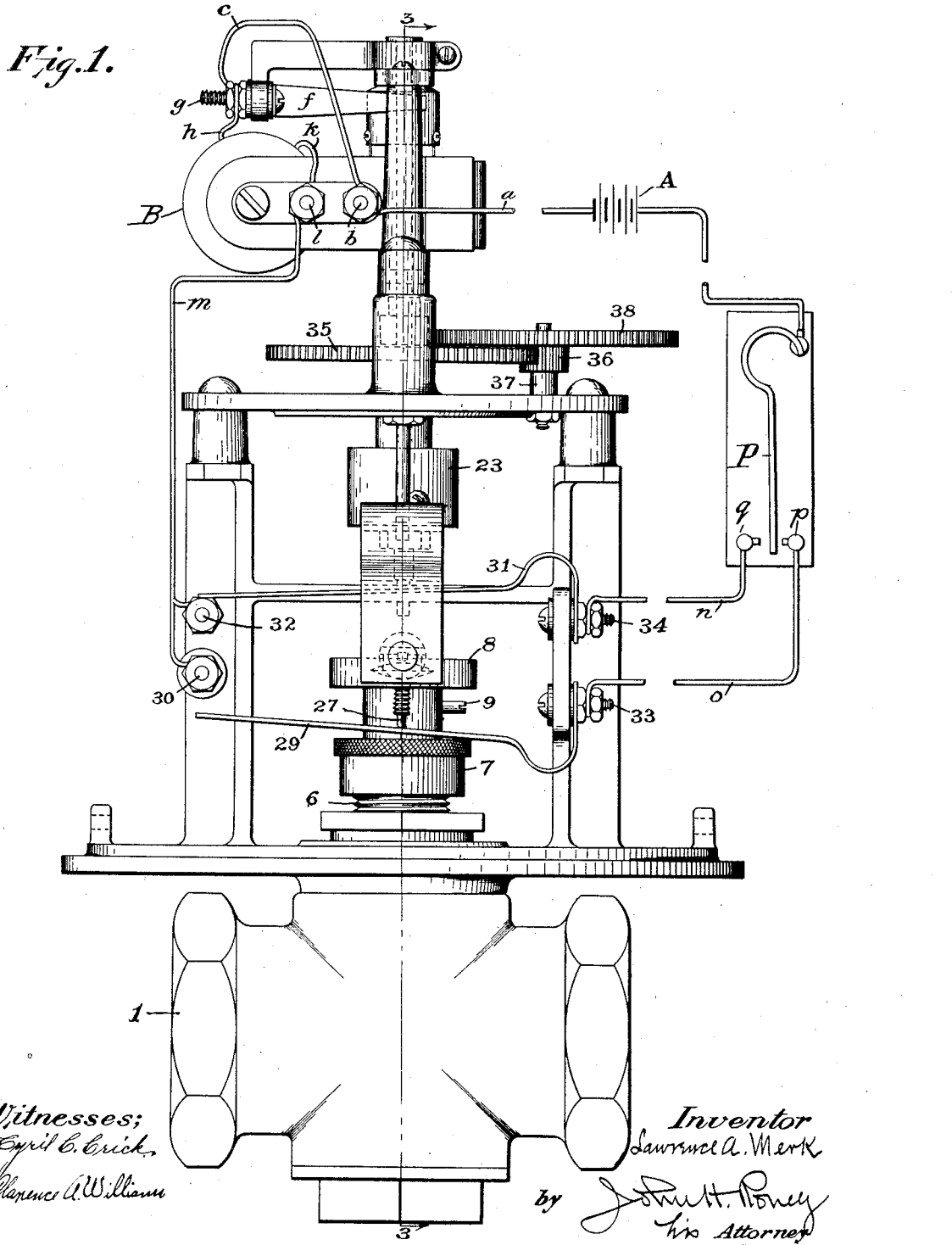

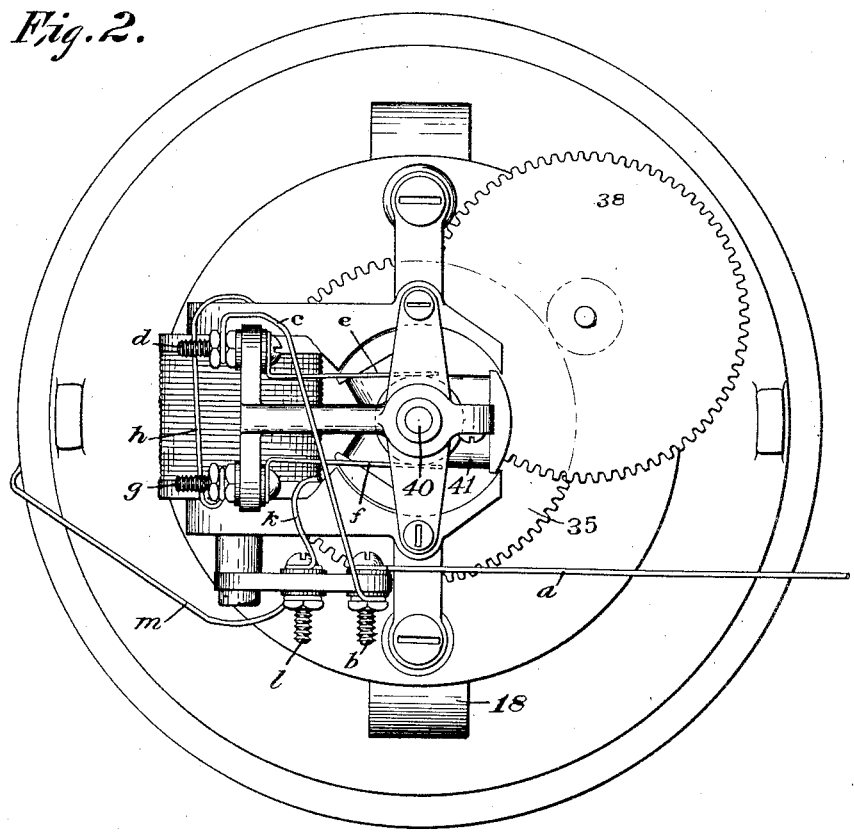
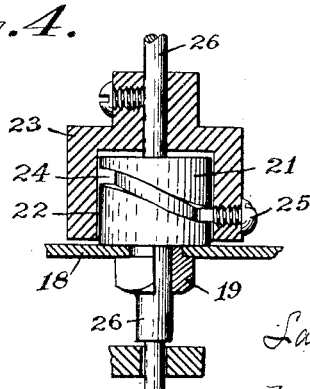

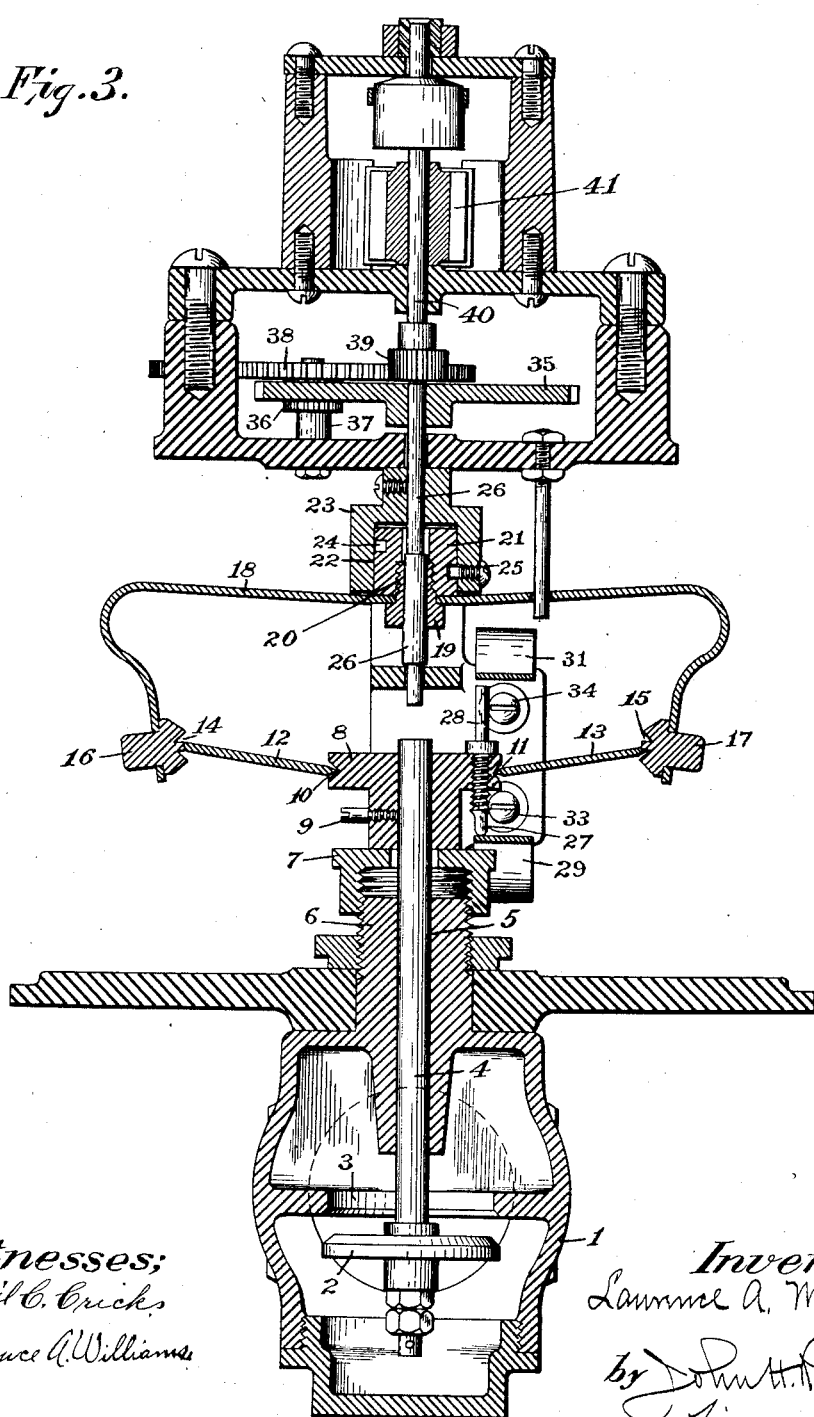

LAWRENCE A. MERK, OF PITTSBURGH, PENNSYLVANIA, ASSIGNOR OF ONE-HALF TO JAMES HAY, OF PITTSBURGH, PENNSYLVANIA.

MEANS FOR CONTROLLING FLOW OF FLUIDS.

1,141,647. Specification of Letters Patent. Patented June 1, 1915.

Application filed November 24, 1909. Serial No. 529,730.

*To all whom it may concern:*

Be it known that I, LAWRENCE A. MERK, a citizen of the United States, residing at Pittsburgh, in the county of Allegheny and State of Pennsylvania, have invented a new and useful Improvement in Means for Controlling Flow of Fluids, of which improvement the following is a specification.

My invention relates to improvements in electrically operated automatic means for controlling the flow of fluids and distribution of heat.

The object of my invention is to avoid the use of chains, ropes, and other forms of flexible or semi-flexible slowly and progressively acting connections for operating the valve or valves, (as is usual in mechanism of this general type or character) or clock mechanism, which have to be wound up by hand, and to produce instead positively actuated instantaneously acting means for operating the valve. I accomplish this object by means of the device hereinafter set forth and described, reference being had to the accompanying drawings, forming part hereof, in which—

Figure 1 is an end elevation of my device. Fig. 2 is a plan view of the same. Fig. 3 is a section on line 3—3 of Fig. 1. Fig. 4 is an elevation, partly in section, of motor-reversing cam.

Referring to said drawings, 1 indicates a pipe adapted to convey air, steam, hot water, or gaseous fuel, dependent upon the medium of heat supply used in the system. The said pipe is provided with a valve 2 which is adapted to control the orifice or opening 3 for the admission of steam, gas, or heated air to and through the system from a source of supply (not shown). The stem 4 of said valve extends through and is freely movable in an orifice 5 formed in the boss 6 and through a cap 7 screwed upon the upper end thereof. The upper end of said stem is secured in and connected with the movable block 8 by means of the set screw 9. The said block is provided with V-shaped grooves or recesses 10, 11 on two sides thereof, in which the inner ends of the valve-actuating toggle members 12, 13 are seated, respectively, the opposite ends of said toggle members being seated in correspondingly shaped recesses 14, 15, formed in the blocks 16, 17, respectively secured upon the lower ends or sides of the yoke 18, which is carried by or attached to the nut 19, the upper end of which is screw-threaded and secured in a socket 20, formed in the cylindrical body 21, which is seated in a socket 22 formed in the cap 23, the exterior surface of said body 21 being provided with an inclined groove or grooves 24, in which a screw or pin 25 projects, the cap 23 being fastened to the shaft 26, whereby, when said shaft is rotated, as hereafter described, the said cap 23 revolves around the body 21, the set screw 25 engaging in the inclined endless groove or grooves carries the yoke downwardly and upwardly, dependent upon the direction of travel of said screw 25 from the upper end of said inclined groove to the lower end thereof or vice versa, thereby automatically reversing the movement of the yoke without reversing the motor, and simultaneously therewith actuating the levers 12 and 13 to snap the valve stem up or down to close the valve or open the same. The said levers are operated by the movement of the yoke, that is to say, immediately the yoke is extended as shown in Fig. 2, sufficient to carry the blocks 16 and 17 in and slightly below horizontal alinement with block 8, the levers snap said block 8 downwardly, thus opening the valve as shown in Fig. 2. The reverse movement of the yoke would depress with blocks 16 and 17 out of the position shown in Fig. 2, until they were slightly below the horizontal plane of the end of said levers engaging in the block 8 at which time the block 8 would be snapped upwardly closing the valve. The movement of the yoke and levers above described likewise carries the pin 27 out of engagement with the contact 29, and the pin 28 into engagement with the contact 31.

The block 8 carries the pins 27 and 28, which are suitably insulated; at the maximum downward movement of the valve stem, pin 27 forces blade conductor 29 out of contact with the binding post conductor 30 and withdraws the pin 28 from the blade conductor 31, the resiliency of which throws the free end thereof into contact with the binding post conductor 32. The curved ends of said conductors 29 and 31 are, respectively, secured to the frame of the device by the binding posts 33 and 34, respectively, both the conductors and the posts being suitably insulated. At the upward movement of the stem this movement is reversed, *i. e.*, the blade conductor 29 being thrown into contact with its binding post while blade conductor 31 is thrown out of contact with its post.

The upper end of said shaft 26 has mounted thereon the cog wheel 35 which meshes with and receives power from the small spur wheel 36, which is mounted upon the short shaft 37. A wheel 38, which is also mounted upon said shaft 37, meshes with the small spur wheel 39 mounted upon the armature shaft 40 of the motor 41. Electric current to operate said motor is transmitted thereto as follows: from the battery A to the motor 41 through conductors $a$ to the binding post $b$, from the binding post $b$ through conductor $c$ to binding post $d$, thence through the brush $e$ to the motor, through brush $f$ to the binding post $g$ to the conductor $h$ through the field of the motor B to the conductor $k$ to binding post $l$, conductor $m$ to the binding posts 30, 32, dependent upon which one of the blade conductors 29, 31 are in contact with, respectively, the binding posts 33 or 34, to conductor $o$ or $n$ to thermostat P when lower end thereof is in contact with posts $p$, $q$ back to battery, as shown in the drawings. The movement of the yoke is about to reverse and close valve, which will remain closed until the temperature decreases sufficiently to contract the thermostat, when the circuit will again be established and the motor started to reverse the yoke. The reversal of the movement of the yoke and consequently the breaking of the current is accomplished automatically by the continuous cam incline 21.

The valve-operating yoke 18 is preferably made of resilient material, as steel, so that the extension and compression thereof is sufficient to snap the levers without the aid of springs, although it is obvious that the yoke may be made of inflexible material and springs may be employed to assist the movement of the toggle members.

Having described my invention, what I claim and desire to secure by Letters Patent is—

1. A device for controlling the flow of fluids, including a valve formed with a stem, a frame, a yoke formed with resilient arms and mounted upon the frame, means for moving the yoke in a direction substantially parallel to the axis of the valve stem, and toggle members disposed between the valve stem and the resilient arms of the yoke, the said toggle members being adapted to be thrown into and out of alinement with each other by the movement of the yoke and the resiliency of the arms of the yoke coöperating with the toggle members to snap the valve open or shut according to the direction in which the yoke is moving.

2. A device for controlling the flow of fluids, including a valve formed with a stem, a frame, a motor upon the frame, a yoke formed with resilient arms, means actuated by the motor for moving the yoke in a direction substantially parallel to the axis of the valve stem, toggle members disposed between the valve stem and the resilient arms of the yoke, the said toggle members having a spring action due to the resiliency of the arms of the yoke and being adapted to be thrown into and out of alinement with each other by the movements of the yoke to produce a quick opening and closing of the valve, and automatic means for controlling the motor.

3. A device for controlling the flow of fluids, including a valve formed with a stem, a frame, an electric motor upon the frame, a yoke, means actuated by the motor for moving the yoke in a direction substantially parallel to the axis of the valve stem, toggle members disposed between the valve stem and the arms of the yoke, the said toggle members having a spring action and being adapted to be thrown into and out of alinement with each other by the movements of the yoke so as to produce a quick opening and closing of the valve, contacts controlling the flow of current to the electric motor, means carried by the valve stem for engaging the contacts, current being shut off from the motor when the valve is actuated and the said contact engaging means of the valve stem is moved from engagement with one contact to engagement with the opposite contact, and means for starting the motor when the said contact engaging means of the valve stem is in engagement with either of the contacts.

4. In mechanism of the character described, the combination of a motor, a frame, a shaft supported in said frame and adapted to be driven by said motor, a yoke supported on said shaft, a valve having a stem, the upper end of which is connected to a block, oppositely projecting fingers carried on said block, toggle members disposed between said block and the dependent ends of said yoke and adapted to be thrown upwardly or downwardly out of the horizontal with a quick movement by the movement of said yoke, contacts adapted to be actuated by the fingers carried by said block, and electric circuits to said motor.

5. A device for controlling the flow of fluids, including a valve formed with a stem, a frame, a motor upon the frame, a shaft adapted to be driven by the motor, a yoke supported by said shaft, means actuated by the rotation of the shaft for imparting a reciprocating movement to the yoke, a block upon the valve stem, toggle members disposed between said block and the ends of the yoke, the said toggle members having a spring action and being adapted to be thrown into and out of alinement with each other by the movements of the yoke to produce a quick opening and closing of the valve, means actuated by the movements of the valve for stopping the motor when the valve is moved from one position to the opposite position, and means for starting the motor.

6. A device for controlling the flow of fluids, including a valve formed with a stem, a frame, a motor upon the frame, a cam member driven by the motor, a yoke member having an operative connection with the cam member whereby it is reciprocated back and forth, toggle members disposed between the valve stem and the arms of the yoke, the said toggle members having a spring action and being adapted to be thrown into and out of alinement with each other by the movements of the yoke to produce a quick opening and closing of the valve, and means for controlling the supply of current to the motor.

7. A device for controlling the flow of fluids, including a valve formed with a stem, a frame, a motor upon the frame, a shaft driven by the motor, a socket upon the shaft, a pin projecting into the socket, a cam member received loosely within the socket and formed with a grooved cam receiving the pin so as to be reciprocated back and forth by the rotation of the shaft, a yoke carried by the said cam member, toggle members disposed between the valve stem and the arms of the yoke, the said toggle members being adapted to be thrown into and out of alinement with each other by the movements of the yoke to produce a quick opening and closing of the valve and means for controlling the motor.

8. A device for controlling the flow of fluids, including a valve formed with a stem, a frame, a motor mounted upon the frame, a shaft driven by the motor, a member loose upon the shaft, means whereby the member is reciprocated back and forth when the shaft is rotated, a yoke carried by the said member, a block upon the valve stem, toggle members disposed between the block and the arms of the yoke, the said toggle members being thrown into and out of alinement with each other by the arms of the yoke so as to produce a quick opening and closing of the valve, and means for controlling the motor.

9. A device for controlling the flow of fluids, including a valve formed with a stem, a frame, a motor upon the frame, a shaft driven by the motor, a reciprocating member having an operative connection with the shaft, a yoke carried by the reciprocating member, a block upon the valve stem, toggle members disposed between said block and the arms of the yoke, the said toggle members being adapted to be thrown into and out of alinement with each other so as to open and close the valve as the yoke is reciprocated back and forth, fingers projecting from the block, contact members arranged in the path of the fingers so as to be engaged thereby when the valve is either opened or closed, means whereby engagement of one of the fingers with the corresponding contact serves to stop the motor when the valve has reached either limit of its movement, and means for closing the circuit to start the motor when the fingers are in engagement with either of the contact members.

In testimony whereof, I have hereunto signed my name in the presence of two subscribing witnesses.

LAWRENCE A. MERK.

In the presence of—
CLARENCE A. WILLIAMS,
JOHN H. RONEY.